US012328323B2

(12) United States Patent
Tormasov et al.

(10) Patent No.: US 12,328,323 B2
(45) Date of Patent: Jun. 10, 2025

(54) SYSTEM AND METHOD OF ANOMALOUS CONFIGURATION-RELATED ACTIVITY

(71) Applicant: Acronis International GmbH, Schaffhausen (CH)

(72) Inventors: Alexander Tormasov, Bremen (DE); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 290 days.

(21) Appl. No.: 18/066,287

(22) Filed: Dec. 15, 2022

(65) Prior Publication Data

US 2024/0205237 A1   Jun. 20, 2024

(51) Int. Cl.
*H04L 9/40* (2022.01)
*H04L 41/16* (2022.01)

(52) U.S. Cl.
CPC .......... *H04L 63/1416* (2013.01); *H04L 41/16* (2013.01); *H04L 63/20* (2013.01)

(58) Field of Classification Search
CPC .. G06F 11/2263; G06F 21/554; G06F 21/566; G06F 21/577; H04L 63/1416; H04L 63/1425; H04L 41/0853; H04L 41/0894
See application file for complete search history.

(56) References Cited

U.S. PATENT DOCUMENTS

| | | | |
|---|---|---|---|
| 10,607,009 B2 | 3/2020 | Dahan | |
| 11,513,878 B2 | 11/2022 | Kulaga et al. | |
| 2021/0385233 A1* | 12/2021 | Chopra | H04L 63/1416 |
| 2022/0321397 A1 | 10/2022 | Tormasov et al. | |
| 2023/0394140 A1* | 12/2023 | Orlando | G06F 21/575 |
| 2024/0054227 A1* | 2/2024 | Dahmen | G06F 21/566 |
| 2024/0089270 A1* | 3/2024 | Razinskas | H04L 63/1416 |
| 2024/0195691 A1* | 6/2024 | Li | H04L 41/0894 |

FOREIGN PATENT DOCUMENTS

| | | |
|---|---|---|
| CN | 109495443 A | 3/2019 |
| JP | 6749106 B2 | 9/2020 |
| KR | 101937325 B1 | 1/2019 |
| WO | 2018164503 A1 | 9/2018 |

* cited by examiner

*Primary Examiner* — Chris Parry
*Assistant Examiner* — Abderrahmen Chouat
(74) *Attorney, Agent, or Firm* — ESPE Legal Consultancy FZ-LLC (57) ABSTRACT

An anomaly detection system uses an AI engine to analyze configurations of endpoints using backup archives and system events on shared network assets to detect and verify anomalies. Cascade of machine-learning models consist of a behavior analysis model and a system configuration model that are trained to detect anomalous configurations of endpoints and behavioral anomalies on shared network assets and configuration-behavior analysis model that is trained to detect threat with great accuracy using a combination of configurations and system events as input.

20 Claims, 5 Drawing Sheets

SYSTEM AND METHOD OF ANOMALOUS CONFIGURATION-RELATED ACTIVITY

TECHNICAL FIELD

The invention pertains to detecting anomalies in computer networks, in particular detection of malicious activity based on baselining of configuration related system activity.

BACKGROUND

There is a type of threat that is designed to infect, steal, encrypt or delete data on network resources. The distribution of the attack vector does not allow it to detect it with the required accuracy by analyzing the state, behavior or patterns on one device, whether it is a network share, a server or a user computer. Accurate detection of distributed attacks requires correlation of events from multiple sources that are used in the kill chain.

Cyberattacks can be linked with abnormal behavior by users and by computer systems generally, such as downloading corporate files or scanning shared storages for information. Other indicators include running scripts or sending commands to a target system when these vary from expected network assets behavior. In many cases, a malicious action is preceded by a configuration change on a client device, from which a malicious action targeted on shared network assets, like network storages, is subsequently performed, such as copying or encrypting data on a network resource.

Solutions such as Endpoint detection and response (EDR), extended detection and response (XDR) and systems that are capable of analyzing big data to correlate events from various systems use universal detection rules in their arsenal, each of which should be tuned for each customer's environment. Moreover, correlation of all events from all systems in the corporate network is a resource-intensive operation and it requires a lot of human resources to adapt known systems in a corporate network.

For networks whose nodes have a non-standard configuration, i.e., are not deployed from templates, such as VDI systems, threat detection based on configuration changes can have a large number of false positives, because changes in the configuration may be legitimate for a given role of a network node or a network segment as a whole. Therefore, a system is needed that will take into account not only the features of a threat associated with configuration changes and identified as characteristic of a certain class of known threats, but also automatically adapt to the specifics of a corporate network.

A related problem arises when configurations of network assets are stored in different systems and services. Relevant and consistent configuration information for backward analysis and detection of appropriate security incidents is difficult to get because system configurations will be changed after malware executes or hackers complete their operations.

SUMMARY

Detection of distributed malicious activity that performs malicious operations on shared network resources from the endpoint of the network uses extended features sets that include not only signatures and behavior patterns that can be used to identify suspicious activity, but also characteristics that determine the threat associated with the change configuration on the endpoint from which this attack is performed. The threat detection system is based on a machine-learning model that is trained on a secure environment, comprising a secure network segment, and known threats. The system first produces a baseline of configuration-related activity patterns. Further, using the trained model, the system starts monitoring the corporate network, collecting system configurations from endpoints and linked network shares. Configurations are captured from backup archives that are related to particular system events, collected from network shares. Thus, the machine-learning model classifies distributed activity that is characterized by pairs of system events and configuration parameters of linked endpoint and network share. The machine-learning model compares the configuration-event pairs with a baseline and predicts the abnormal behavior in a network. Prediction represents a probabilistic assessment of the compliance of a set of features, consisting of events and configurations, with normal behavior in a corporate network, to which the baseline corresponds.

In one embodiment, a computer implemented method for anomalous configuration-related activity detection based on a cascade of machine-learning models includes the steps of training machine-learning models and detecting an anomalous configuration-related activity at threat detector. The training process comprises switching the threat detector to training mode, obtaining system events of shared network assets at threat detector, and obtaining system configuration parameters of endpoints linked to shared network assets at the threat detector. The training process further comprises preprocessing obtained system events and system configuration parameters to convert them into a dataset format for processing by a machine-learning model at the threat detector, training behavior analysis machine-learning model on obtained system events and training configuration-behavior analysis machine-learning model on obtained system events and configuration parameters of linked endpoints and shared network assets. Inputs of the behavior analysis machine-learning model are system events, and the output is a probabilistic characteristic of suspicious activity on at least one shared network asset. Inputs of the configuration-behavior analysis machine-learning model are system configuration parameters, system events and the output is a probabilistic characteristic of configuration-related anomalous activity on linked endpoint and shared network asset. Detecting an anomalous configuration-related activity at threat detector comprises switching the threat detector with trained machine-learning models to detection mode, collecting system events of shared network assets at threat detector, analyzing collected system events with the trained behavior analysis machine-learning model, registering anomalous activity on at least one shared network asset, if probabilistic characteristic of suspicious activity on the shared network asset exceeds the first predefined threshold, determining list of endpoints linked to shared network assets on which the anomaly is registered, obtaining system configuration parameters of listed endpoints from backup archives, analyzing collected system events and obtained system configurations with the trained configuration-behavior analysis machine-learning model and detecting anomalous configuration-related activity if probabilistic characteristic of configuration-related anomalous activity on linked endpoint and shared network asset exceeds the second predefined threshold.

In another embodiment, machine-learning models of threat detectors are trained on system events and system configuration parameters obtained from a guaranteed protected network of endpoints and shared network assets.

In yet another embodiment, machine-learning models of threat detectors are trained on system events and system configuration parameters obtained from an infected network of endpoints and shared network assets.

In an alternative embodiment, machine-learning models of threat detectors are trained on system events and system configuration parameters obtained from corporate networks.

In an alternative embodiment, a list of endpoints linked to shared network assets is determined using system configuration parameters of endpoints corresponding to access permissions to shared network assets.

In an alternative embodiment, a list of endpoints linked to shared network assets is determined using system events of shared network assets corresponding to network connections.

In an alternative embodiment, a shared network asset is at least one of shared network storage, website, ftp-server, remote computer, mail server, proxy server.

In an alternative embodiment, the system events comprise at least one of the operating system events, API calls, driver logs, network events, hooked operations, system metrics, bios parameters.

In an alternative embodiment, system configurations comprise at least one of hardware configuration parameters, application configuration parameters, system setting parameters, installed updates, registry keys, application files parameters, system users, running processes, system files, user files, connected networks, active network connections.

In another embodiment, a computer-implemented method for configuration-related threat detection based on a cascade of machine-learning models comprises training machine-learning models at a threat detector and detecting anomalous configurational changes at threat detector. Training machine-learning models comprises switching the threat detector to training mode, obtaining system events of shared network assets at threat detector, obtaining system configuration parameters of endpoints linked to shared network assets at threat detector, preprocessing collected system events and system configuration parameters to convert them into a dataset format for processing by machine-learning models at threat detector, training configuration analysis machine-learning model on obtained system configuration parameters and training configuration-behavior analysis machine-learning model on obtained system events and configuration parameters of linked endpoints and shared network assets. The inputs of configuration analysis machine-learning model are the system configuration parameters, and the output is a probabilistic characteristic of suspicious configurational activity on at least one endpoint. The inputs of a configuration-behavior analysis machine-learning model are system configuration parameters and system events. The output is a probabilistic characteristic of configuration-related anomalous activity on a linked endpoint and shared network asset. Detecting anomalous configurational changes at the threat detector comprises switching the threat detector with trained machine-learning models to detection mode, collecting system configuration parameters of endpoints. System configuration parameters are collected from endpoints and backup archives. Collected system configuration parameters are analyzed with the trained configuration analysis machine-learning model, registering anomalous configuration change on at least one shared network asset, if a probabilistic characteristic of suspicious configurational activity exceeds a first predefined threshold. A list of shared network assets, linked to endpoints on which the anomaly is registered, is determined. The method further comprises collecting system events of listed shared network assets at the threat detector, analyzing collected system events and system configuration parameters with the trained configuration-behavior analysis machine-learning model, and detecting configuration-related threat if probabilistic characteristic of configuration-related anomalous activity on linked endpoint and shared network asset exceeds a second predefined threshold.

DETAILED DESCRIPTION

Figure 1:
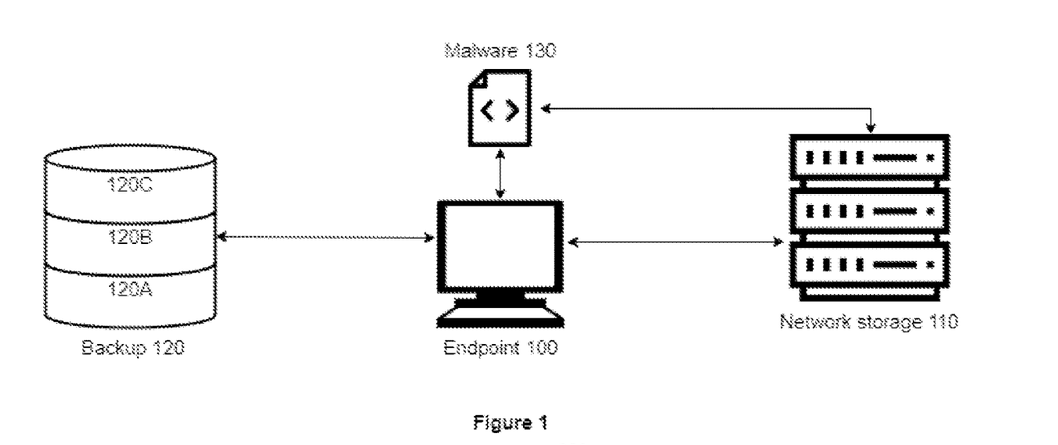
FIG. 1 shows a distributed threat model.

An overview of a distributed threat model of operation in computer networks is shown in FIG. 1. Endpoint 100, having access to shared network resource 110, operates with a file system on shared network asset 110. The shared network asset, also referred to as network resource or shared storage or network storage or network folder, stores data or files that can be modified from the endpoint 100. A shared network asset can be a network storage, a website, an ftp-server, a remote computer, a mail server, a proxy server or a cloud storage. Modification includes reading, copying, creating, modifying, searching, deletion, editing, saving, changing of metadata, encrypting and other operations that can be applied to network storage 110. When the endpoint 100 is infected with a threat 130, like virus, ransomware, trojan or any other type of the malware that is targeted on network shared resources, it starts scanning or searching for accessible storages 110 to steal information or to modify it. In some embodiments the endpoint 100 can be configured to save backup copies to the backup system for restoration purposes in case of any failures, but backup cannot prevent an attack.

Figure 2:
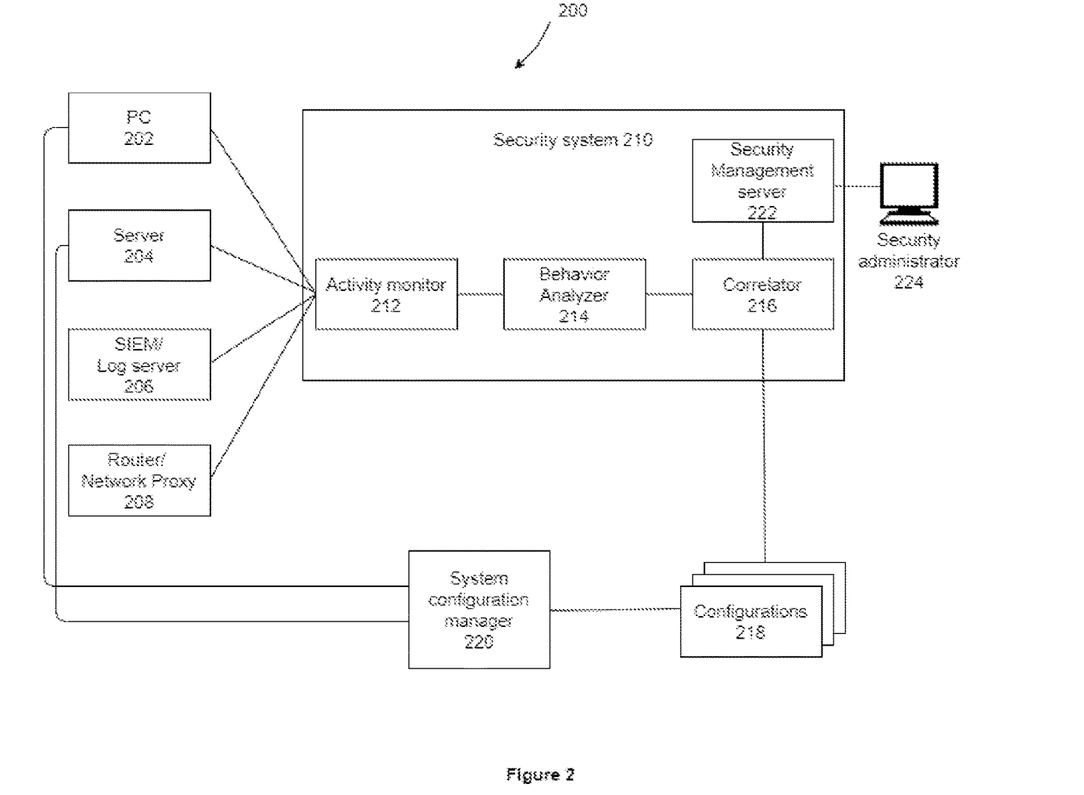
FIG. 2 shows an example of standard implementation of an anomaly detection system.

Conventional elements of an anomaly detection system are shown in FIG. 2. Personal computer 202, server 204, SIEM/log server 206, and router/network proxy 208 all communicate with security system 210 by way of activity monitor 212. Activity monitor 212 is coupled to behavior analyzer 214, which in turn communicates with correlator 216. Correlator 216 has access to configurations 218. Configurations 218 are received from system configuration manager 220, which stores configuration profiles of personal computer 202 and server 204.

Activity monitor 202, collects and sends events from PC 202 and server 204 to behavior analyzer 214. Events include system events such as event logs, system driver events, and proxies logs etc. Behavior analyzer 220 can be based on an expert system, signature search engine, behavior patterns comparison algorithms or machine-learning techniques. The output or result of behavior analysis is a security incident, alert, or indicator of attack, that is further analyzed by correlator 216. Correlator 216 detects configuration-related incidents by correlating behavior analysis outcomes with endpoint configurations using predefined security rules. The result of correlator 215's work is a detected suspicious activity. This activity is referred to as an anomaly. Anomalies related to configuration are sent to security management server 222 and are listed or displayed to system administrators using system administrator console 224. The system of FIG. 2 cannot use detailed detection rules produced to detect some particular threat, because the correlator processes all events from all connected network nodes and is not able to predict connectivity of particular network resources and cannot predict malicious activity on endpoints based on configuration changes by design. The system of FIG. 2 also requires extensive work on detection rules and event parsing customization. This means that the system of FIG. 2 will have relatively poor rates of detection and error.

Figure 3:
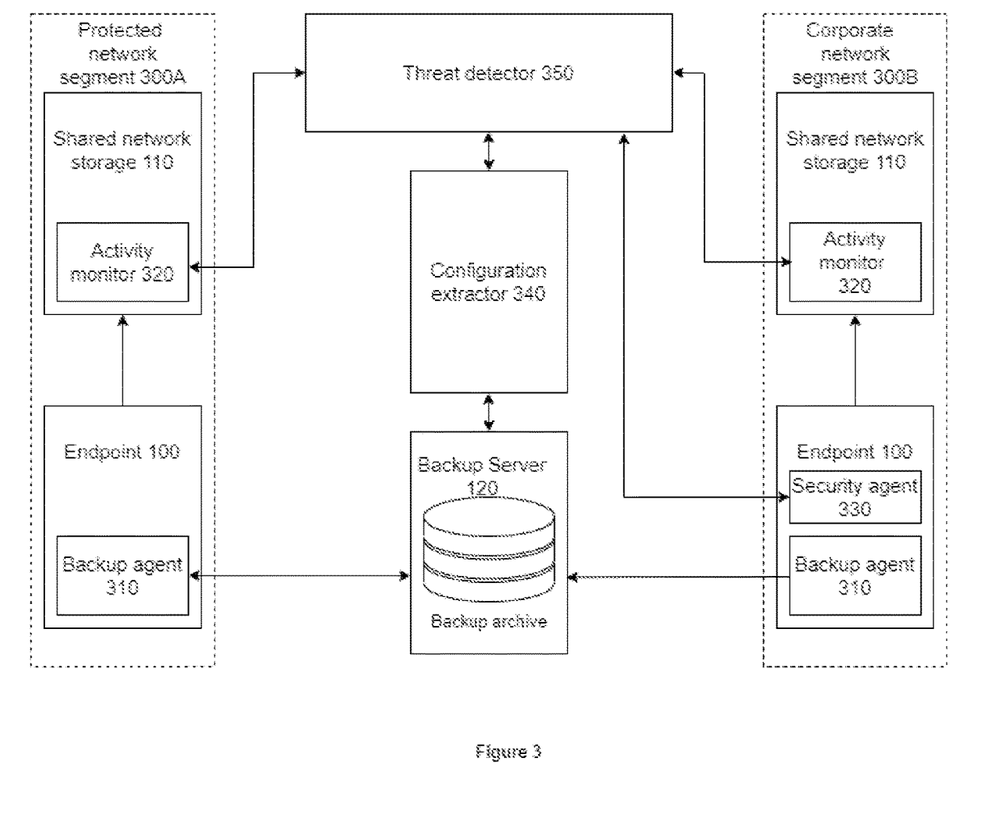
FIG. 3 shows an implementation of an anomalous configuration-related activity detection system.

An example of implementation of an anomalous configuration-related activity detection system that improves the system of FIG. 2 is shown in FIG. 3. In this exemplary schema, threat detector 350 is connected to protected network segment 300A and corporate network segment 300B. A secure network segment can be a segment of a corporate network with a guaranteed absence of threats in the perimeter of this segment. Security can be guaranteed by checking or scanning the network and network nodes at all available levels: scanning network interactions, applications, firmware, checking access rights, installing all updates and scanning the network for vulnerabilities. Also, a secure network segment can be synthetically created specifically for the purpose of training a security system with no default threats, for example, to be completely isolated from the external Internet network, with software and hardware installed from trusted lists. A secure network segment can be either physical or virtual or emulated. The protected network segment 300A and corporate network segments 300B correspond in type and roles of network assets. They include endpoints 100 such as personal computers, mobile devices, servers and virtual machines, and shared network storage 110 accessible to at least a portion of the end nodes.

Threat detector 350 is a component of a security system that is based on machine-learning modules and is trained to detect anomalies and threats in system activity of shared network storage 110 and configuration parameters of endpoints 100. Threat detector 350 can be implemented in a form of computer program, dedicated physical or virtual server, set of microservices and can be installed in corporate environments, in the cloud or on security vendor premises.

In an example, a threat detector 350 is trained based on protected network segment 300A activity data. It receives system events from shared network storage and configurational parameters from endpoints of protected network segment 300A. The data on which the detector 350 is trained are considered legitimate and are generated during the operation of the network or as a result of execution of the scripts that simulate network and user activity. The training of the detector 350 is considered complete when all possible data from the network has been collected or the collected data is sufficient to detect an anomaly with a predetermined level of error. In an embodiment, the predetermined error rate is 5% or less. After training is completed, the detector switches to detection mode. In other implementations, the detector 350 may be trained on bad data that characterizes malware attacks or operations. Also, the detector 350 can be trained on collections of legitimate interactions and dangerous interactions. In yet another implementation, the detector 350 can be trained on corporate network data in supervisor mode, which will mark interactions as valid or suspicious.

Threat detector 350 collects or receives events from shared network assets 110 using an activity monitor 320. Activity monitor is an application, operating system service, driver or network monitoring tool that is capable of reading, capturing, hooking, subscribing to, indicating or generating events characterizing system activity on shared network assets 110. Event types of events which are collected by the activity monitor includes network connections, file system operation, storage API calls, data entropy metrics, I/O operations, and other activities that may be significant for threats in accordance with threat patterns.

Threat detector 350 also processes, as an input, system configuration in the form of a parameters vector, a structured data file, binary data, or other data package. A system configuration sent to or received by a threat detector represents the current system configuration of the endpoint, and the system configuration corresponding to a time period of interest. In yet another example, the system configuration represents the system configuration change, referred to as configuration diff, characterizing difference between two system configurations of one endpoint in different points of time, or related to different system states. In other embodiments the configuration diff represents the deviation from the baseline of multiple endpoints, grouped by the role of computer, by the user profile, by active directory structure, or by connection to shared network assets.

System configuration information may include hardware configurations, application configurations, such as those found in settings, updates, registry keys, and application files, system configurations, including those for system users, running processes, operating system settings, installed applications, system files and user files, connected networks, and active sessions. Other sources of configuration parameters are user parameters, such as permissions, titles, and certificates.

System configuration or configuration diffs are captured from system backup archives and stored on backup server 120. A backup stores changes made on protected endpoints via backup agent 310 running on each endpoint 100. Backup server 308 stores data about system history, including past and current system configurations, user activity, installed applications, connections, and other distinctive aspects of the system. Configurations from backup copies are captured by the configuration extractor 340. It can access the backup server using an API or be a functional part of the backup server. Using backup as a configuration source reduces the need for additional storage and processing resources utilization. It also simplifies backward analysis. If the suspicious activity on a shared network storage is detected first, then configuration of a connected endpoint, related to the state prior to connection, is required. Storing system configurations for all endpoints with all chronological changes in a directory will take a lot of storage resources and will also increase the network traffic but using backup for configuration exchange solves this problem too.

Threat detector 350 can detect possible threats based on configuration change only. Threat detector 350 can detect possible threats based on activity pattern or partial activity pattern only. But there are many examples of threats when threat detection only on configurations or only on system events from one host is not possible, because activity is very similar to legitimate. In this case, it is required to detect a threat or refine the detected anomaly on the event-configuration pair. After threat detector 350 detects suspicious configuration-behavior anomaly, it assesses the possibility of the false positive verdict. In case if the possibility of the threat detection is lower than predefined value, the threat detector 350 can raise an alert for system administrator at system administrator console 224 or for user of the endpoint at security agent 310. If the verdict of threat detector 350 has a high level of confidence, which means that the level of false positive is low, then the threat detector 350 blocks the execution of the malicious process and cures the endpoint from the malware using security agent 310. A detector built on a machine-learning model, in the course of collecting events and configuration changes, constantly predicts the probability of a threat realization and can produce the final verdict on any stage of malicious operation, depending on the level of confidence, defined in security policy. For example, if security policy is switched to a critical level of security, then prediction of 60-70% can lead to threat detection and suspicious process termination. And if the security level is set up to the low level of security, then only a prediction of 95% will raise a response action and incident detection. The security level for each network node or endpoint can be different and may depend on the incident history, asset importance, data criticality level, user profile and other external aspects.

Figure 4:
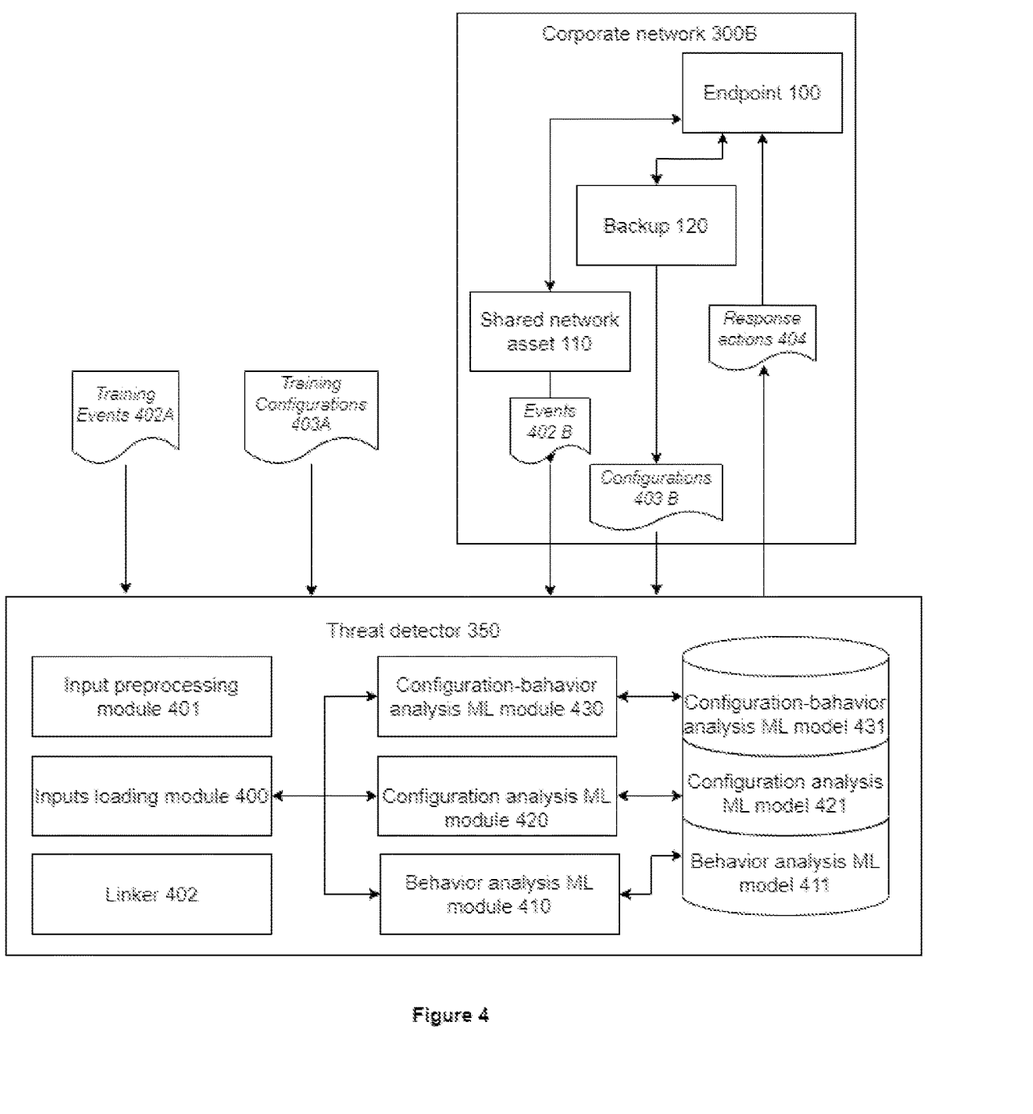
FIG. 4 shows a functional schema of an anomalous configuration-related activity detection system.

FIG. 4 shows the functional schema of the exemplary implementation of an anomalous configuration-related activity detection system. This example of the system is applicable to analyze such threats that are targeted on shared folders and network storages, like ransomware or spyware. An example of killchain comprises the malicious file is loaded to endpoint 100 and triggered to start execution. The malware prepares the system to work, for example downloads and installs applications, changes security settings, edits registry keys, turns off system services, or configures a network adapter or changes the mode of processing. A malicious process opens a remote session or file-transfer session with network shared storage, copies files to a remote computer, modifies the files and encrypts them. Execution of the malicious program can be postponed until an external command or system state occurs. All configuration changes made to the endpoint 100 are tracked from the initial state in chronological, structured and labeled manner. For example, if the malicious file creates a storage partition and then starts copying their files from network storage, then the configuration change related to partition creation will be structurally associated with copy action or time stamps. In parallel the event monitor on the shared network storage 120 is controlling activity on the network storage and logs all operations, referred to as events.

Events collected from shared network resources and configurations of end nodes are loaded into the threat detector. Depending on the chosen method of training detection models, during the training process the detector 350 processes events 402A and configurations 403A from clean devices, from infected devices, and from a real corporate network. Depending on the learning method, events 402A and configurations 403A can be marked as appropriate for legitimate or malicious activity.

The threat detector 350 comprises input data preprocessing module 401, input data loading module 400, linker 402, analysis modules 410, 420, 430, and analysis models 411, 421, 431. The data loading module 400 manages connections to data sources, sends requests to load data from certain network nodes and at certain points in time, and processes incoming data streams. For example, loading module 400 requests events from network storages 110 in case of configuration changes on one or more devices 100. In another example, the loading module 400 retrieves lists of configurations from hosts connected to the network storage 110 where suspicious activity is detected. Also, the loading module 400 interacts with the backup 120 to load into the detector 350 lists of network node configurations necessary for analysis or training models.

The input data preprocessing module 401 performs filtering of events and configuration parameters, their normalization, enrichment, deduplication and coding, in accordance with the specification of analysis models.

The linker 402 processes events and configurations and defines the link of endpoints with network storages. For example, by the configuration of the end node or the profile policy, access rights to the network share can be determined, such as reading, editing, and limiting folders. In another example, a connection is determined from a log of connections and operations when a connection session is opened, or data is transferred. Link determination is necessary to process logically related configurations 403B and events 402B that can characterize a distributed threat, so as not to try to match all events from all storages with all network node configurations.

Analysis modules 410, 420, 430 are a software environment for performing calculations using machine-learning models. A set of scripts and software environments that perform operations are used. Machine-learning models 411, 421, 431 describe a set of mathematical transformations over a set of features of incoming data, feature weights, functions of normalization, testing, filtering, and other methods for classification, similarity search, overlay, and so on. Modules 410, 420, 430 use models 411, 421, 431 and provide interaction of models in various modes comprising sequential processing, parallel processing, cascade of models, ensemble, cyclic processing, and other logical structures for linking models, input data, and verdicts.

In one particular example, threat detector 350 comprises three functional ML based components: module 430 and model 431 of configuration-behavior analysis, module 420 and model 421 of configuration analysis and module 410 and model 411 of behavior analysis.

Module 410 and model 411 of behavior analysis provides classification or comparison with the baseline of an event or a set of events characterizing system activity on the network storage and determines the deviation from normal behavior, thereby detecting an anomaly of behavior on the network storage. The verdict returned by the module 410 is the probability value of the input values being normal. In another implementation, the verdict may be a probability value of the correspondence of the input values to the infection state. In another embodiment, the module may return, in addition to the match probability, a subset of input features indicating an anomaly, and additionally may contain event parameters that identify the network storage and the time of registration of input events.

Module 420 and model 421 of configuration analysis provides classification or comparison with the baseline of a configuration parameter or a set of configuration parameters characterizing system configuration of the endpoint and determines the deviation from normal configuration, thereby detecting an anomaly of configurational change on the endpoint. The verdict returned by the module 420 is the probability value of the input values being normal. In another implementation, the verdict may be a probability value of the correspondence of the input values to the infection state. In another embodiment, the module 420 may return, in addition to the match probability, a subset of input features indicating a threat, and additionally may contain configuration parameters that identify the endpoint and the time of registration of inputs.

Module 430 and model 431 of configuration-behavior analysis provides classification or comparison with the baseline of an event or a set of events characterizing system activity on the network storage and determines the deviation from normal behavior, thereby detecting an anomaly of configuration related behavior in the network. If the model is trained on configuration change patterns and events characterizing known distributed threats, then the module in conjunction with the model classifies or compares with the class characterizing the threats. Module 430 and model 431 can operate with events and configuration parameters corresponding to the current state of endpoints and network storages, but in this case a detection rate will be not adequate. In addition, module 430 is triggered by the positive verdict of anomaly detection at configuration analysis ML module 420 or by the positive verdict of anomaly detection at behavior analysis ML module 420. Then the threat detector requests configurations and events corresponding to detected anomalies and analyzes them. The verdict returned by the module 430 is the probability value of the input values being normal. In another implementation, the verdict may be a probability value of the correspondence of the input values to the infection state. In another embodiment, the module may return, in addition to the match probability, a subset of input features indicating a threat, and additionally may contain event parameters that identify the network storage and the time of registration of input events.

When the threat detector 350 detects an anomaly or a threat, it generates a response action 404 in accordance with security policy and verdicts of ML based analysis. Response action can be executed on the endpoint 100. Additionally, it can be sent to a shared network asset 110, firewall or other security component that is applicable to process the response action 404.

Figure 5A:
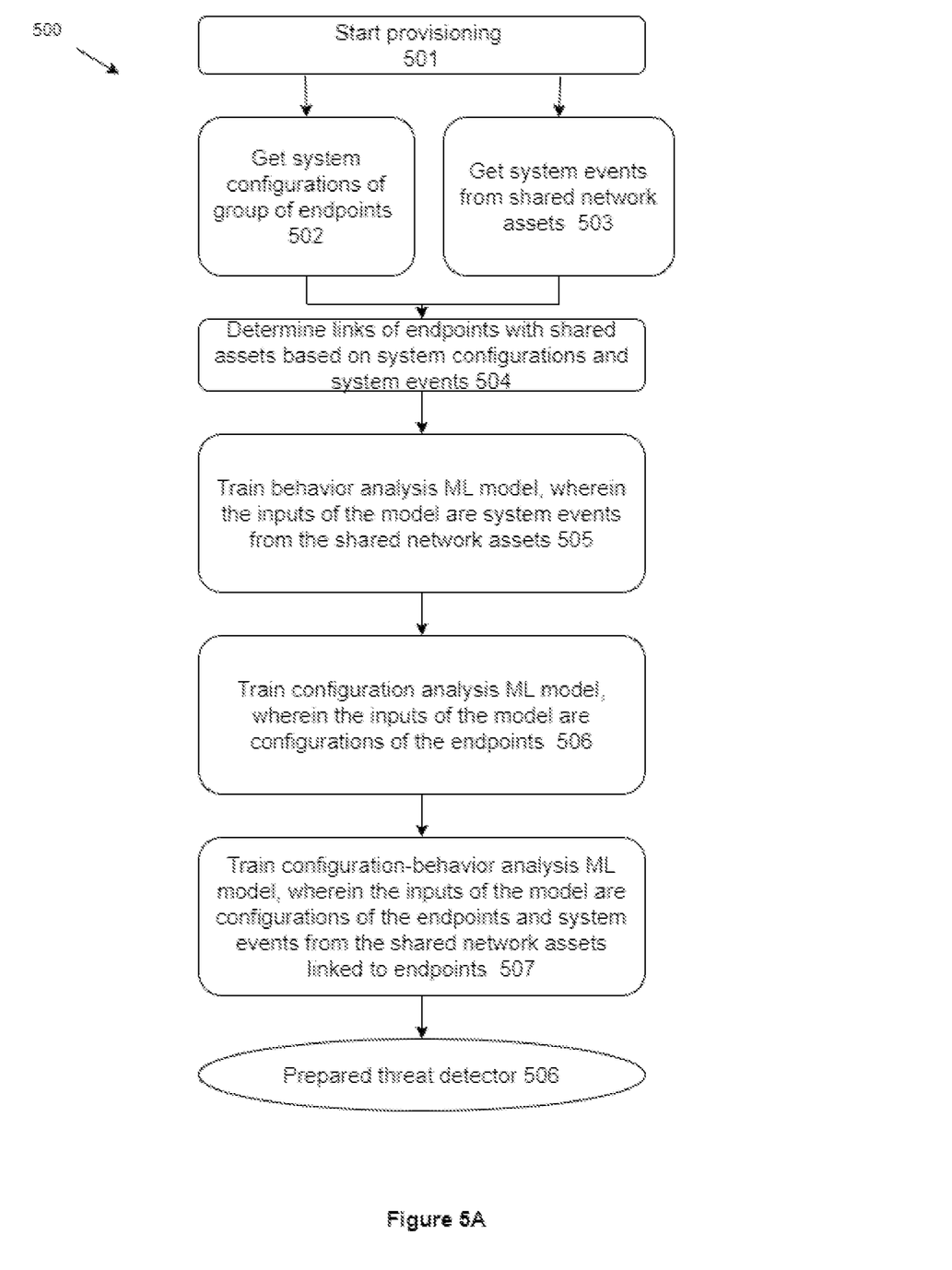
FIG. 5A shows a process for training configuration-related activity detection models of a threat detector.

Example of a process for training configuration-related activity detection models of a threat detector is shown on FIG. 5A. The process start is scheduled or starts by request, for example manually, when a new threat sample is added to a threat sample collection or when a new version of threat processing model is released. The process 500 starts with provisioning 501 the training environment. For example, the step 501 may contain configuring or deploying network assets, installing monitoring agents and connecting event sources.

At step 502, system events are collected in the course of the system training process or are loaded from system event collections that consist of system events previously gathered from guaranteed protected network assets. System events may comprise one of or combination of operating system events, API calls, driver logs, network events, hooked operations, journals or logs, collected metrics and other indications or system operation of endpoint, network storage and network environment.

At step 503, system configurations are captured in the course of the system training process or are loaded from system configuration collections that consist of system configuration previously gathered from guaranteed protected network assets. System configurations from the endpoints are collected when the execution of the threat sample starts and ends. Additionally, system configurations can be collected in particular moments corresponding to predefined system events. Based on collected system configurations, changed parameters and value of the changed parameters are determined.

At step 504, events of network connections and configurations of endpoints are analyzed to determine links between endpoints and network storages.

At step 505, a behavior analysis model is trained. Collected at step 503 events determine a class of normal behavior baseline. If the events correspond to malicious behavior, then a trained model will determine at least one class of malicious behavior patterns or multiple subclasses, each of which contains threat examples of particular type.

At step 506 the configuration analysis model is trained. Collected at step 502 configuration parameters determine a class of normal configuration baseline. If the parameters correspond to malicious behavior, then a trained model will determine at least one class of malicious configuration profile or multiple subclasses, each of which correspond to a threat example of a particular type.

At step 507 configuration-behavior analysis ML model is trained. The inputs of the model are configurations of the endpoints and system events from the shared network assets linked to endpoints. The model defines classes of normal and malicious states of endpoints linked to network shares. Training configuration-behavior analysis ML model may also include configuring and sequencing all models into cascades of ensembles to produce consistent verdicts of detection. The result of the training process 500 is the prepared threat detector 506.

Figure 5B:
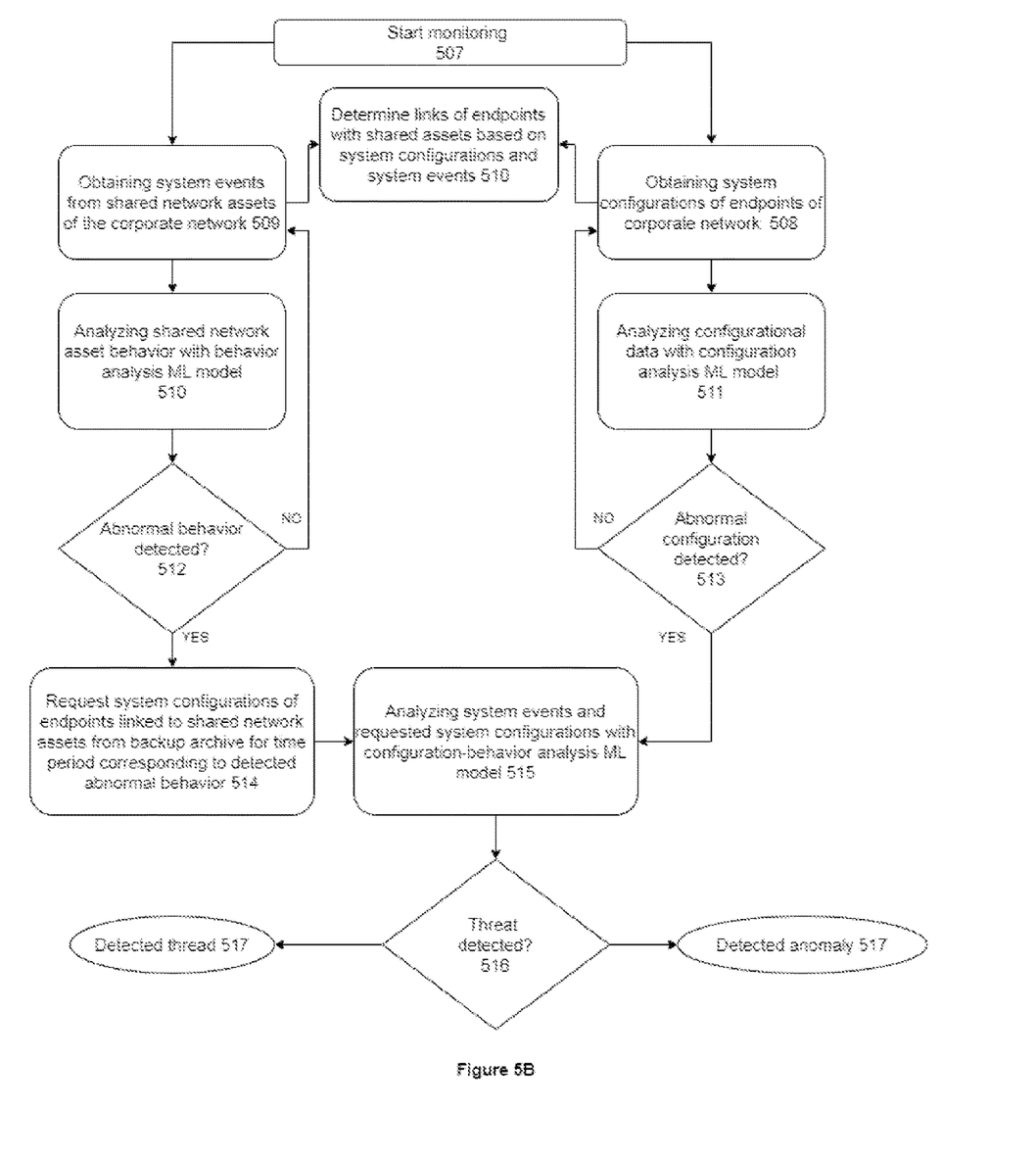
FIG. 5B shows a process for anomalous configuration-related activity detection.

Example of a process for anomalous configuration-related activity detection is shown on FIG. 5B. The process starts with the start of monitoring 507 network storage activity and endpoint configurations, by switching the threat detector to monitoring or detection mode from the training mode.

At step 508 system configurations of endpoints connected to the corporate network are obtained. In parallel at step 509, system events from shared network assets are obtained. Both events and configurations correspond to the current or real time state of shared network assets and endpoints. System events and configurations can be collected in a synchronized manner, for example at the same time or based on the same triggers.

Based on obtained system events and system configurations, at step 510, links of endpoints and shared network assets are determined.

Obtained configurational data and events are preprocessed and analyzed independently. Event analysis using the behavior analysis ML model is performed at step 510 and configuration analysis using configuration analysis ML model is performed at step 511.

If suspicious behavior was detected 512 at step 510, that is, a probabilistic assessment of the deviation of the behavior from normal or the degree of similarity of the behavior to malicious behavior exceeds the specified level, then an anomaly is recorded, which includes data about the host on which the suspicious behavior was recorded, session opening timestamps with the endpoint and/or timestamps of events that characterize suspicious activity and list of events from network share that are performed during the suspicious activity. Deviation from normal behavior or similarity to a threat does not mean the presence of a threat or malware, so the verdict of the behavioral analysis model needs to be verified. To do this, at step 514, configurations of end nodes linked to the network storage on which suspicious behavior is recorded are loaded, which correspond to the time period of suspicious activity. Configurations are defined from backup archives, such as slice backups or full endpoint backups. A backup copy can also be presented in the form of snapshots of machines or disk images. Further, in step 515, the events collected from the network node for the time period corresponding to the anomaly detected in step 512 and the configuration parameters from the end nodes linked to the network storage collected in step 514 are analyzed using the configuration-behavior analysis ML model. Extended number of input parameters makes it possible to detect a distributed threat with high accuracy or to supplement a registered anomaly with additional information, such as a configuration change on one or more endpoints preceding the anomaly. Based on the evaluation of the configuration-behavior analysis ML model, the presence of a threat is determined at step 516 and, as a result, an incident with a detected threat is recorded 517 or an anomaly remains recorded 517.

In parallel, an anomaly can be fixed on the basis of the configuration parameters collected in step 508 by analyzing them with the configuration analysis ML model in step 511. An anomaly or suspicious configuration change of one or more end nodes logged in step 513 also has a high error rate, since a configuration change may be caused by an update or upgrade of end nodes, service maintenance, or other scheduled work on the corporate network. To get a more accurate verdict, the configuration parameters and their changes are sent for analysis along with events on network storages associated with endpoints and analyzed using the 515 model. The process is then identical to that described earlier.

The invention claimed is:

1. A method for anomalous configuration-related activity detection in a computer system based on a cascade of machine-learning models, the method comprising the steps of:
   a. training the machine-learning models at a threat detector, further comprising:
      i. switching the threat detector to a training mode;
      ii. obtaining system events of shared network assets at the threat detector;
      iii. obtaining system configuration parameters of endpoints linked to the shared network assets at the threat detector;
      iv. preprocessing the obtained system events and system configuration parameters to convert the obtained system events and system configuration parameters into a dataset format for processing by a machine-learning model at the threat detector;
      v. training a behavior analysis machine-learning model on the obtained system events, wherein inputs of the behavior analysis machine-learning model are the obtained system events and output of the behavior analysis machine-learning model is a probabilistic characteristic of suspicious activity on at least one shared network asset; and
      vi. training a configuration-behavior analysis machine-learning model on the obtained system events and system configuration parameters of linked endpoints and shared network assets, wherein inputs of the configuration-behavior analysis machine-learning model are the obtained system events and system configuration parameters and output of the configuration-behavior analysis machine-learning model is a probabilistic characteristic of configuration-related anomalous activity on at least one linked endpoint and shared network asset.

2. The method of claim 1 further comprising detecting an anomalous configuration-related activity at the threat detector, further comprising
   i. Switching the threat detector to a detection mode;
   ii. collecting system events of shared network assets at the threat detector;
   iii. analyzing the collected system events with the trained behavior analysis machine-learning model;
   iv. registering anomalous activity on at least one shared network asset, if the probabilistic characteristic of suspicious activity on the shared network asset exceeds a first predefined threshold;
   v. determining a list of endpoints linked to shared network assets on which the anomalous activity is registered;
   vi. obtaining system configuration parameters of listed endpoints in the list of endpoints from backup archives;
   vii. analyzing the collected system events and the obtained system configuration parameters with the trained configuration-behavior analysis machine-learning model; and
   viii. detecting anomalous configuration-related activity if the probabilistic characteristic of configuration-related anomalous activity on the at least one linked endpoint and shared network asset exceeds a second predefined threshold.

3. The method of claim 1, wherein the system events and system configuration parameters are obtained from a guaranteed protected network of endpoints and shared network assets.

4. The method of claim 1, wherein the system events and system configuration parameters are obtained from an infected network of endpoints and shared network assets.

5. The method of claim 1, wherein the system events and system configuration parameters are obtained from corporate networks.

6. The method of claim 2, wherein the list of endpoints linked to shared network assets is determined using system configuration parameters of endpoints corresponding to access permissions to shared network assets.

7. The method of claim 2, wherein the list of endpoints linked to shared network assets is determined using system events of shared network assets corresponding to network connections.

8. The method of claim 1, wherein the shared network asset is at least one of shared network storage, a web-site, an ftp-server, a remote computer, a mail server, or a proxy server.

9. The method of claim 1, wherein the system events comprise at least one of operating system events, API calls, driver logs, network events, hooked operations, system metrics, or bios parameters.

10. The method of claim 1, wherein the system configuration parameters comprise at least one of hardware configuration parameters, application configuration parameters, system setting parameters, installed updates, registry keys, application files parameters, system users, running processes, system files, user files, connected networks, or active network connections.

11. A computer implemented method for configuration-related threat detection based on a cascade of machine-learning models, the method executed on a processor, the method comprising:
   a. training the machine-learning models at a threat detector, comprising:
      i. switching the threat detector to a training mode;
      ii. obtaining system events of shared network assets at the threat detector;
      iii. obtaining system configuration parameters of endpoints linked to the shared network assets at the threat detector;
      iv. preprocessing the obtained system events and system configuration parameters to convert the obtained system events and system configuration parameters into a dataset format for processing by a machine-learning models at the threat detector;
      v. training a configuration analysis machine-learning model on the obtained system configuration parameters, wherein inputs of the configuration analysis machine-learning model are the system configuration parameters and output of the configuration analysis machine-learning model is a probabilistic characteristic of suspicious configurational activity on at least one endpoint; and vi. training a configuration-behavior analysis machine-learning model on the obtained system events and system configuration parameters of linked endpoints and shared network assets, wherein inputs of the configuration-behavior analysis machine-learning model are the obtained system events and system configuration parameters and output of the configuration-behavior analysis machine-learning model is a probabilistic characteristic of configuration-related anomalous activity on at least one linked endpoint and shared network asset.

12. The method of claim 11 further comprising detecting an anomalous configurational change at the threat detector, including:

i. switching the threat detector to a detection mode;
ii. collecting system configuration parameters of endpoints, wherein system configuration parameters are collected from endpoints and backup archives;
iii. analyzing the collected system configuration parameters with the trained configuration analysis machine-learning model;
iv. registering the anomalous configuration change on at least one shared network asset, if the probabilistic characteristic of suspicious configurational activity exceeds a first predefined threshold;
v. determining a list of shared network assets linked to endpoints on which the anomalous configurational change is registered;
vi. collecting system events of shared network assets in the list of shared network assets at the threat detector;
vii. analyzing the collected system events and the collected system configuration parameters with the trained configuration-behavior analysis machine-learning model; and
viii. detecting a configuration-related threat if the probabilistic characteristic of configuration-related anomalous activity on the at least one linked endpoint and shared network asset exceeds a second predefined threshold.

13. The method of claim 11, wherein the system events and system configuration parameters are obtained from a guaranteed protected network of endpoints and shared network assets.

14. The method of claim 11, wherein the system events and system configuration parameters are obtained from an infected network of endpoints and shared network assets.

15. The method of claim 11, wherein the system events and system configuration parameters are obtained from corporate networks.

16. The method of claim 12, wherein the list of endpoints linked to shared network assets is determined using system configuration parameters of endpoints corresponding to access permissions to shared network assets.

17. The method of claim 12, wherein the list of endpoints linked to shared network assets is determined using system events of shared network assets corresponding to network connections.

18. The method of claim 11, wherein the shared network asset is at least one of shared network storage, a web-site, an ftp-server, a remote computer, a mail server, or a proxy server.

19. The method of claim 11, wherein the system events comprise at least one of operating system events, API calls, driver logs, network events, hooked operations, system metrics, or bios parameters.

20. The method of claim 11, wherein system configuration parameters comprise at least one of hardware configuration parameters, application configuration parameters, system setting parameters, installed updates, registry keys, application files parameters, system users, running processes, system files, user files, connected networks, or active network connections.

* * * * *